Feb. 28, 1961 R. P. ROUSSET 2,973,123
FLUID DISPENSING MEANS
Filed April 16, 1958 3 Sheets-Sheet 1

Inventor
RENÉ PAUL ROUSSET

By
Aaron R. Townshend Attorney

Feb. 28, 1961  R. P. ROUSSET  2,973,123
FLUID DISPENSING MEANS
Filed April 16, 1958  3 Sheets-Sheet 2

Inventor
RENE PAUL ROUSSET
By
Aaron R. Townshend Attorney

United States Patent Office 2,973,123
Patented Feb. 28, 1961

2,973,123

FLUID DISPENSING MEANS

Rene Paul Rousset, Middlesex, England, assignor to Sparklets Limited, a British company Filed Apr. 16, 1958, Ser. No. 728,858

Claims priority, application Great Britain Apr. 18, 1957

5 Claims. (Cl. 222—394)

This invention relates to means for dispensing a fluid under pressure and more particularly to valve assemblies for use in such means.

While the present invention is especially applicable to valve assemblies for dispensing a predetermined and constant amount of the fluid, that is to say the valve assembly is arranged to act as a metering valve, arrangements in accordance with the present invention can also be used for providing a continuous discharge when the valve is actuated.

According to one aspect of the present invention, a valve assembly for controlling the discharge of a fluid under pressure comprises a member having a bore and provided with a seating for a resilient sealing member arranged to be also in contact with said seating by a biasing force, the actuating member slidable in said bore and having a passage therein through which discharge can occur, said actuating member having an annular sealing skirt making resilient contact with the wall of the bore and said actuating member having an end adapted to be pressed on the resilient sealing member to break the seal between it and the seating.

According to another aspect of the present invention, a valve assembly for controlling the discharge of a fluid under pressure comprises a member having a bore and provided with a seating for a resilient sealing member arranged to be held in contact with said seating by a biasing force, the actuating member slidable in fluid tight manner in said bore and having a passage therein through which discharge can occur, said actuating member having an end adapted to be pressed on the resilient sealing member to break the seal between it and the seating, said biasing force being provided at least in part by compression of one or more integral projections provided on said resilient sealing member.

As applied to a metering valve for dispensing a predetermined quantity of a fluid under pressure, the valve assembly may comprise a metering chamber, a normally closed inlet valve for controlling the admission of fluid to the metering chamber and a normally open outlet valve for controlling the discharge of fluid from the metering chamber, the arrangement being such that the inlet valve cannot be opened until the outlet valve has been closed and the arrangement being characterised in that pressure exerted through the sealing surfaces of the outlet valve provides at least part of the force for opening the inlet valve. If desired, pressure exerted through the sealing surfaces of the outlet valve may provide the whole of the force for opening the inlet valve.

In a modification of the valve assembly, to enable it to provide a continuous discharge of fluid when actuated, the outlet valve can be omitted so that when the inlet valve is opened by moving the resilient sealing member out of contact with its seating, fluid is discharged through the valve assembly.

In a valve assembly of the metering type, the outlet valve may comprise an axially movable valve stem having a discharge passage for the fluid therein, the valve stem being adapted on axial movement to be first brought into sealing engagement with a valve member so as to close the discharge passage, and thereafter on continued movement of the valve stem to move the valve member against a biasing force to open the inlet valve, the means for achieving this sequence of events being such that at no time during the sequence are the inlet and outlet valves open at the same time, thereby preventing a state of continuous discharge through the device. This biasing force may be constituted at least in part by the pressure of the fluid in the container and/or at least in part by biasing means such as a spring. Alternatively, the biasing force may be constituted at least in part by the natural resilience of the material from which the valve member is made as hereinafter described.

The valve stem may be formed integrally with or carried by an actuating member arranged to slide in fluid-tight manner within a cylindrical member mounted on the container with an open end in communication with the interior of the container. This open end will normally be closed by the valve member.

Means must be provided to prevent leakage of fluid between the inner wall of the cylindrical member and the outer wall of the actuating member sliding therein. Such means may conveniently comprise a skirt of resilient material which is not substantially affected by the fluid to be dispensed, for example of polythene, carried by the stem and in sealing contact with the wall of the chamber. The skirt may be separate from the stem or it may be integral therewith. In the latter case, the material from which the stem and skirt are made must be sufficiently resilient to ensure good sealing contact with the wall of the chamber and yet rigid enough to ensure that the stem is able to move the valve member to open the inlet valve. Polythene is a material having the desired combination of qualities, but other types of suitably resilient materials such as synthetic and natural rubbers and like materials can be used. The choice between forming the skirt integrally with or separate from the stem may depend to some extent on the size of the components. Where the stem and skirt are of relatively large proportions, it may be desirable from the point of view of ease of manufacture to produce them as separate components.

The metering chamber is constituted by the annular space within the cylindrical member between the valve member and the sealing skirt when the valve stem is in the position when it is just about to break the seal between the valve and cylindrical members.

For convenience of operation, the actuating member may be made integral with or have mounted thereon a housing to obtain the necessary directional and discharge characteristics of the fluid being dispensed. With this arrangement, operation of the dispensing means is affected merely by relative motion between the housing and the container.

The valve member may conveniently be made of rubber or like resilient material and may be housed within a valve cage mounted in the container in such manner that the valve member is normally held in sealing contact with a valve seat to close the inlet valve by the natural resilience of the material from which it is made. Alternatively, instead of using a valve cage, the valve member may be housed in the container opening, the latter having been formed in such a manner that the valve member is held in sealing contact with the valve seat.

The container may be arranged to be used either in the upright position (that is, with the opening carrying the dispensing means uppermost) or in the inverted position, the choice depending on the type of fluid to be dispensed in conjunction with the type of application for which it is required. When used in the upright position, the fluid is admitted from the container to the metering chamber through a syphon tube terminating close to the bottom of the container, in order to ensure that almost all of the fluid in the container can be used. This syphon tube can conveniently be mounted in fluid tight manner on the valve cage if one is used. If a valve cage is not used, the syphon tube may be mounted in other ways and still ensure that it is in fluid tight communication with the metering chamber. When the container is used in the inverted position, no syphon tube is of course necessary.

The present invention will now be more particularly described with reference to the accompanying drawings in which.

In the drawings, like parts in each figure are denoted by the same reference numeral.

Figure 1:
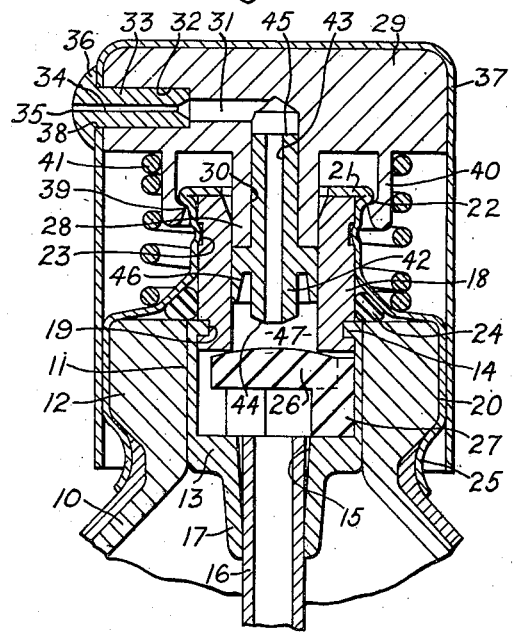
Figure 1 is a longitudinal section of one form of valve assembly according to the invention, adapted for dispensing a predetermined quantity of fluid with the container in the upright position.
Figure 2:
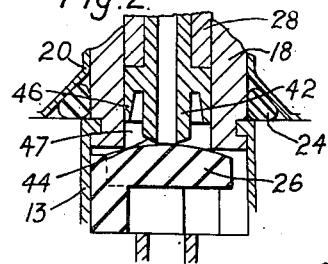
Figures 2 and 3 are fragmentary longitudinal sections of the valve assembly of Figure 1 illustrating stages in the operation of the assembly.
Figure 3:
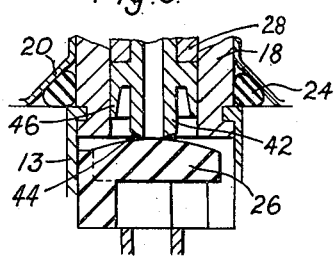

Referring to Figures 1, 2 and 3 of the drawings; a container 10, adapted to contain a fluid under pressure, is provided with an open neck portion 11 having an outwardly projecting flange 12. The container 10 may be of glass, metal or any other suitable material capable of withstanding the pressure of the fluid.

Fitted within the neck 11 of the container 10 is a cup-shaped valve cage 13 of a material having a slight degree of resiliency, for example, polythene. The open upper end of the cage 13 is provided with an inwardly-directed flange 14. The bottom of the cage 13 is provided with an axial bore 15 in which is mounted a syphon tube 16 extending into the container and terminating close to the bottom thereof. The syphon tube 16 is a press-fit within the skirt 17, integral with the cage 13, so as to ensure a fluid-tight seal between the cage and the syphon tube.

A cylindrical member 18 is mounted within the rim of the cage 13, the flange 14 of the latter keying with an annular groove 19 in the outer surface of the member 18. Owing to the slight resilience of the cage 13, there is no difficulty in spring fitting the flange 14 into the groove 19.

The cage 13 and the cylindrical member 18 are held in position on the container 10 by a shaped metal ferrule 20. The ferrule has an inwardly-directed flange 21 at its upper end which fits over the upper end of the member 18 and is provided with a projecting shoulder 22. Below this, the ferrule 20 is crimped into an annular groove 23 in the outer surface of the cylindrical member 18. The ferrule 20 on assembly, compresses an annular sealing ring 24 located in the angle between the cylindrical member 18 and the top of the neck 11, so as to prevent leakage of fluid. The ferrule 20 is shaped to fit closely over the flange 12 and is finally crimped at 25 below the neck. Within the valve cage 13 is housed a sealing member 26 of soft rubber or other suitably resilient material. The sealing member 26 is held in sealing contact with the inner periphery of the cylindrical member 18 by upward pressure exerted by three integral legs 27 which abut against the bottom of the cage 13 and are in a state of slight axial compression. This provides a means to urge into intimate contact the sealing surfaces of sealing member 26 and cylindrical member 18. This objective could alternatively be achieved with a spring.

Slidably mounted within the member 18 is an actuating member 28, provided with an integral upper portion 29 of increased diameter approximately equal to that of the ferrule 20 at its widest part. The actuating member 28 is provided with an axial bore 30 which communicates with a discharge orifice. In the construction shown in Figure 1, the bore 30 meets a radial bore 31 opening at the outer peripheral surface of the portion 29. The portion 32 of the bore 31 adjacent the surface of the portion 20 is made of increased diameter to receive a plug 33 which is itself provided with a narrow axial bore 34, terminating in a discharge orifice 35 in the head 36 of the plug 33. An inverted cup-shaped housing 37 is fitted closely over the portion 29 and extends downwardly to form a sliding fit over the ferrule 20 where it fits over the flange 12, thus serving as a guide for the travel of the actuating member 28. The housing 37 is provided with an aperture 38 registering with the bore 32. Rotation of the housing 37 is prevented by the plug 33, the head 36 of which is made of greater diameter than the aperture 38.

The extent of travel of the actuating member 28 in the cylindrical member 18 in the direction towards the container 10 is limited by abutment of the lower surface of the portion 29 against the inwardly directed flange 21 of the ferrule 20, and in the direction away from the container 10 by abutment of an internal flange 39 formed at the end of a skirt 40 integral with and depending from the portion 29 against the lower surface of the shoulder 22 of the ferrule 20. The actuating member 28 is urged in the direction away from the container 10 by a spring 41 surrounding the skirt 40 and bearing at one end against the lower surface of the portion 29 and at its other end against the ferrule 22 where it fits over the top of the flange 12.

Within the bore 30 of the actuating member 28 is fixed a valve stem 42 made of polyethylene or like slightly resilient material and having an axial bore 43. One end 44 of the stem 42 projects beyond the end of the actuating member 28. The other end 45 terminates a convenient distance before the junction of bores 30 and 31.

The normal position of the parts is shown in Figure 1, while Figures 2 and 3 show progressive positions during the actuation of the valve.

Movement of the actuating member 28 towards the container 10 from the position shown in Figure 1 is transmitted to the valve stem 42, whose end 44 first comes into sealing contact with the sealing member 26, as shown in Figure 2, before further movement of the end 44 moves the sealing member 26 out of sealing contact with the end of the cylindrical member 18, as shown in Figure 3. The flexibility and shape of the sealing member 26 are such that during the travel of the end 44 towards and away from the container, sealing contact between the end 44 and the sealing member 26 and between the sealing member 26 and the lower end of the cylindrical member 18 are never broken simultaneously. When the sealing contact is broken between the lower end of the cylindrical member 18 and the sealing member 26, fluid is permitted to flow from the container 10 via the syphon tube 16 and the valve cage 13 into an annular metering chamber 47, defined within the cylindrical member 18 as hereinafter described, but is prevented from leaving the chamber 47 by the sealing contact between the end 44 and the sealing member 26. When the manual pressure on the housing 37 is released, the actuating member 28 is moved in the direction away from the container 10 by the action of the spring 41, thus permitting the sealing member 26 to seal against the lower end of the cylindrical member 18 and trapping a fixed quantity of fluid within the metering chamber 47. As the actuating member 28 is further retracted, contact between the end 44 of the valve stem 42 and the sealing member 26 is broken, and the fluid trapped within the metering chamber 47 is forced through the bores 43, 31 and 34 to be discharged through the discharge orifice 35 by expansion of gas contained in the fluid. An identical amount of fluid will be discharged at each complete stroke of the actuating member 28. This amount will depend upon the size of the chamber 47 which may be varied within the limits of the possible travel of the actuating member 28 by altering the relative position of the end 44, which may be achieved by altering the length of the valve stem 42 projecting beyond its junction with the inner profile of the skirt 46.

In order to prevent leakage of fluid between the inner wall of the cylindrical member 18 and the outer walll of the actuating member 28, the valve stem 42 is provided with an integral annular sealing skirt 46 projecting from its outer surface and abutting against the lower end of the actuating member 28, the periphery of the skirt 46 making sealing contact with the inner wall of the cylindrical member 18 by virtue of the shape and flexibility of the skirt 46 and the sealing fit between it and the inner wall of the cylindrical member 18.

The metering chamber 47 is defined by the inner wall of the cylindrical member 18, the sealing member 26 and the side of the valve stem 42, skirt 46 and the junction between valve stem 42 and skirt 46 when the lower end 44 of the stem 42 is in contact with the sealing member 26, and contact between the sealing member 26 and cylindrical member 18 is about to be broken.

For convenience of manufacture and assembly, it may be desirable to form from materials having a slight degree of resilience the valve cage 13, the cylindrical member 18, the valve stem 42, the skirt 46, and the actuating member 28. It will be apparent that the material used must be substantially inert towards the fluid to be dispensed. An example of a material having the required properties is polythene but other materials such for example as nylon may be used.

Figure 4:
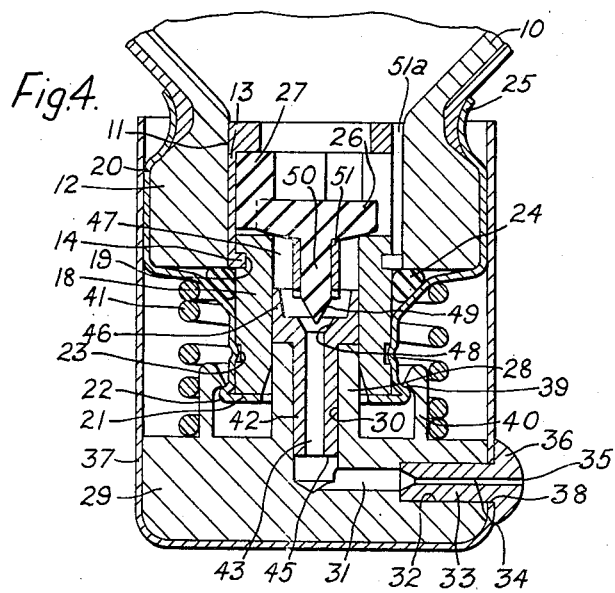
Figure 4 is a longitudinal section of a modification of the valve assembly of Figure 1, adapted for use with the container in the inverted position.

Figure 4 shows the valve assembly of Figure 1 modified for use with the container in the inverted position. In this position, a syphon tube is unnecessary, the fluid flowing directly from the container into the interior of the valve cage 13. The valve cage 13 does not require to include a dependent skirt 17 since it does not need to be fitted with a syphon tube. The construction of the valve stem 42 and the sealing member 26 are modified, the valve stem not extending beyond the skirt 46 but terminating instead in a frusto-conical seating 48 formed on the end of the bore 43. This seating is arranged to be put into sealing engagement, on movement of the actuating member 28, with a conical end 49 of an integral projection 50 from the surface of the valve member 26. Flexing of the projection 50 other than the small degree required to form sealing contact in operation with the conical end 49 is prevented by a stiffening sleeve 51 surrounding the cylindrical portion of the projection 50 but terminating at a suitable point which will allow some deformation of conical end 49 to ensure sealing contact between conical end 49 and seating 48. With this modification of the valve stem and valve member, where a liquid is to be dispensed from the container 10 in an inverted position by virtue of the pressure generated by liquefied gas contained in the liquid, there is no danger of residual liquid remaining in the metering chamber 47 because the outlet from the metering chamber is at the lowest point thereof when the device is fully operated.

In order to assist in preventing the trapping of pressurising gas within the valve cage 13, the outer wall of the valve cage 13 is provided with axial slots 51a, through which such gas can escape when liquid enters the valve cage. The structure and operation of the dispensing means of Figure 4 is otherwise similar to that of Figure 1 with the exception that the force to break the sealing contact between the valve member 26 and the lower end of the cylindrical member 18 is partially transmitted by contact of the lower end of valve stem 42 with the end of the stiffening sleeve 51.

Figure 5:
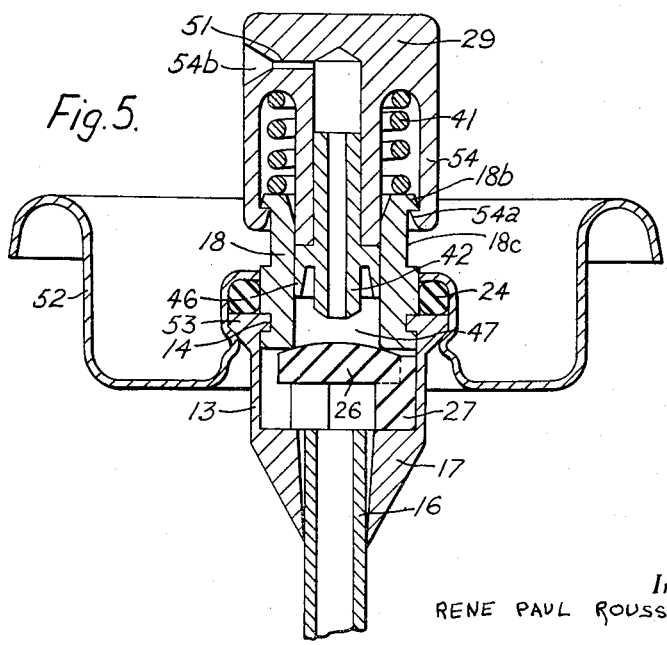
Figure 5 is a longitudinal section of a further modification of the valve assembly of Figure 1, adapted for use with a metal container in which the cap in which the valve assembly is mounted also forms a closure member for the container.

Figure 5 shows a modification of the valve assembly of Figure 1 adapted for mounting on a metal or plastic container. In this modification the profiled sleeve 20 is omitted, its place being taken by a cap 52 forming the closure of the container. The cap 52 is provided with a central housing within which the dispensing means is mounted, the cap being profiled to fit over the sealing ring 24 and over an outwardly extending flange 53 on a modified form of the valve cage 13 to hold the latter in fluid-tight position in the cap 52. Following assembly of the sealing ring 24, cylindrical member 18 and valve cage 13 containing the sealing member 26 and syphon tube 16, the central housing of the cap 52 is crimped in below the outwardly extending flange 53 in such manner as to retain the annular sealing ring 24 in compression to prevent leakage of the fluid. A simplified form of activator is used in this modification, the housing 37 being replaced by a dependent skirt 54 integral with the portion 29 and having an inwardly directed flange 54a at its lower end, which owing to its resiliency can be sprung during assembly over an outwardly directed flange 18b at the upper end of the cylindrical member 18. The upwards travel of the actuating member 28 is restricted by abutment of the inwardly directed flange 54a and the outwardly directed flange 18b and the downwards travel towards the container is restricted by the lower edge of the flange 54a abutting against a shoulder formed by the lower edge of a groove 18c formed in the outer surface of the cylindrical member 18, which groove also provides the outwardly extending flange 18b. The spring 41 is housed within the skirt 54. The nozzle 33 is omitted, the bore 31 opening directly into an orifice 54b of suitable shape in the outer surface of the portion 29. The construction and operation of the valve assembly shown in Figure 5 is otherwise similar to that of Figure 1.

Figure 6:
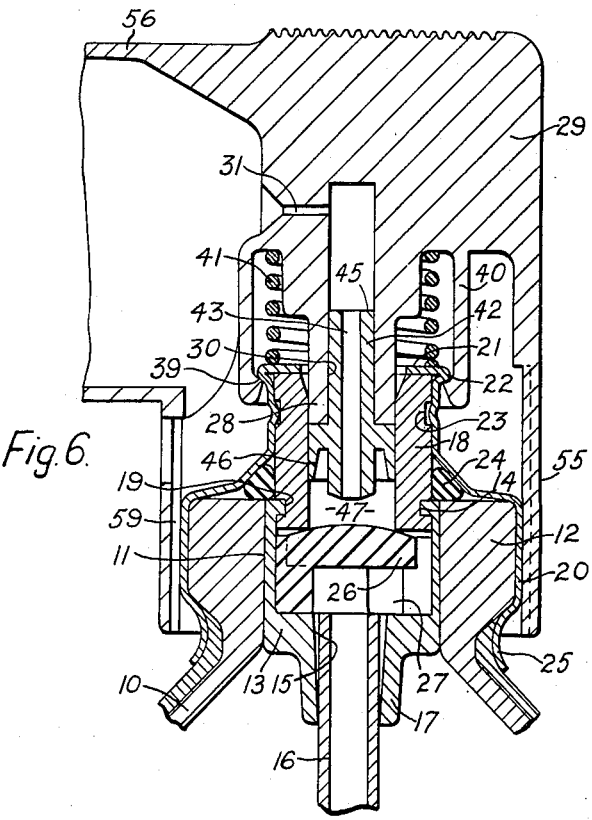
Figure 6 is a longitudinal section of a further modification of the valve assembly of Figure 1, showing an alternative mounting for the biasing spring and a mouthpiece for discharging a spray of the contents of the container.

Figure 6 shows the dispensing means of Figure 1 modified to include a mouthpiece into which the spray of fluid is directed. In this arrangement, the housing 37 is replaced by a dependent skirt 55 integral with the portion 29 of the actuating member 28. The mouthpiece comprises a tubular outlet member 56 integral with the actuating member 28 and having its axis parallel to that of the bore 31. In this embodiment, the nozzle 33 is omitted, the bore 31 or an insert therein being so arranged to provide the desired discharge characteristics, for example, spray or jet. The spring 41 is housed in this embodiment within the skirt 40 bearing at one end against the underside of the portion 29 and at the other against the flange 21 of the ferrule 20.

This embodiment incorporating a mouthpiece is particularly suitable for the oral dispensing of medicaments. In such applications, it may be desirable that the spray of medicament should be admixed with atmospheric air, and for this purpose flutes 59 are provided on the inside of the skirt 55 through which air may be drawn into the tube 56.

It will be appreciated that the mouthpiece may be replaced by any other dispensing means adapted, for example, to introduce the discharged fluid into the ear, nose, or other body cavity or onto a surface either as a spray or as a jet.

It will be appreciated that the modified arrangements illustrated in Figures 5 and 6 may be modified as illustrated in Figure 4 if the container is required to be operated in the inverted position.

Figure 7:
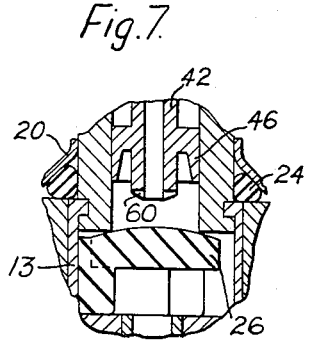
Figures 7 and 8 are fragmentary longitudinal sections of modifications of the valve assembly of Figures 1 and 2 respectively, adapted for continuous dispensing of fluid.
Figure 8:
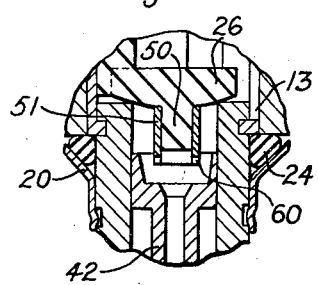

As ilustrated in Figures 7 and 8, the valve assemblies shown in any of Figures 1 to 6 may easily be modified to produce a continuous discharge of fluid should this be required. In the case of a valve assembly of the type illustrated in Figure 1 in which the container is upright and the valve assembly mounted at the top, it is only necessary to introduce a slot 60 in the end 44 of the valve stem 42, as shown in Figure 7, or a similar passageway to provide continuous communication between the inside of the container and the discharge passage 43 when during operation, the sealing member 26 is held out of sealing contact with the end of the cylindrical member 18, so that fluid may pass through this slot to the bore 43 when the end 44 is in sealing engagement with the sealing member 26.

In the modified valve assembly shown in Figure 8 adapted for use with the container inverted as illustrated in Figure 4, in order to convert it for continuous discharge of fluid it is necessary to reduce the length of the projection 50 of the sealing member 26, so that the sleeve 51 projects beyond the end of the projection 50, and to introduce a slot 60 in this projecting part of the sleeve 51 or a similar passageway to provide continuous communication between the inside of the container and the discharge passage 43 when, during operation, the sealing member 26 is held out of sealing contact with the end of the cylindrical member 18.

The valve assembly of the present invention has a further advantage in that filling of the container is extremely simple. The pressure needed for discharge of the fluid is provided by an admixed content of gas in liquefield form which will only exist in this form if the fluid is maintained under a pressure above atmospheric pressure or is cooled below normal ambient temperature. It has hitherto usually been necessary either to fill the container with the fluid in a refrigerated condition before the valve assembly is mounted in position thereon, which may also entail refrigeration of the container, or alternatively to fill after the valve assembly is mounted in position by forcing the fluid under pressure through the narrow apertures and passages through which it passes in the reverse direction on its subsequent release. With the valve assembly of the present invention, the container can be filled with the valve assembly in position, merely by withdrawing the actuating means 28 together with the valve stem 42 and the sealing skirt 46 or equivalent parts from the cylindrical member 18, depressing the sealing member 26 to open the inlet valve by pressure or any suitable means and filling with fluid under pressure through the inlet valve which can, of course, be pushed open as widely as may be necessary.

It will be noted that the valve assembly of the present invention can be constructed of such materials that the fluid does not come into contact with any metallic surface during its passage through the device. The biasing force required to assist retention of the seal between the cylindrical member and the sealing member may also be obtained without the use of any form of metallic spring.

It will also be noted that the speed of operation of the valve assembly does not affect the constancy of the amount of fluid dispensed when the assembly is arranged to dispense a predetermined quantity of fluid, provided that the speed of operation is not so fast that the metering chamber is not completely filled during the period whilst the inlet valve is open.

I claim:

1. A dispensing device for controlling the discharge of a fluid under pressure comprising a cylindrical member, a resilient sealing member, means for holding said resilient sealing member in sealing contact with an end of said cylindrical member, an actuating member slidable in said cylindrical member and having walls defining a passage therein through which discharge can occur, and an annular sealing skirt carried by said actuating member and making resilient contact with the inner wall of said cylindrical member, said actuating member having an end adapted to be pressed on said resilient sealing member to break the seal between it and said end of said cylindrical member.

2. A dispensing device for dispensing a predetermined quantity of a fluid under pressure comprising a cylindrical member, a resilient sealing member, means for holding said resilient sealing member in sealing contact with an end of said cylindrical member, said holding means comprising at least one integral projection provided on said resilient sealing member and in a state of compression, said resilient sealing member and said end of said cylindrical member constituting an inlet valve for controlling the admission of fluid to said cylindrical member, an actuating member slidable in fluid-tight manner in said cylindrical member and having a hollow stem through which discharge of fluid from said cylindrical member can occur, an annular sealing skirt integral with said hollow stem and making contact with the inner wall of said cylindrical member, the end of said hollow stem being adapted to be brought into sealing engagement with said resilient sealing member whereby discharge of fluid from said cylindrical member through said hollow stem is prevented, and thereafter to exert pressure on said resilient sealing member to break the seal between it and said end of said cylindrical member, whereby fluid is permitted to flow into said cylindrical member.

3. A dispensing device according to claim 1 adapted for the continuous discharge of fluid from a container wherein said actuating member is provided with a hollow stem, the interior of said stem constituting said discharge passage, the end of said hollow stem being adapted to be pressed on said resilient sealing member to break the seal between it and said end of said cylindrical member, means being provided whereby fluid can pass from said cylindrical member to said discharge passage while the end of said hollow stem is in contact with said resilient sealing member.

4. A dispensing device for dispensing a predetermined quantity of a fluid under pressure comprising a cylindrical member, a resilient sealing member, means for holding said resilient sealing member in sealing contact with an end of said cylindrical member, said holding means comprising at least one integral projection provided on said resilient sealing member and in a state of compression, said resilient sealing member and said end of said cylindrical member constituting an inlet valve for controlling the admission of fluid to said cylindrical member, an actuating member slidable in fluid-tight manner in said cylindrical member and having a hollow stem through which discharge of fluid from said cylindrical member can occur, and an annular sealing skirt integral with said hollow stem and making contact with the inner wall of said cylindrical member, the end of said hollow stem being adapted to be brought into sealing contact with the end of a projection integral with said resilient member whereby discharge of fluid from said cylindrical member through said hollow stem is prevented, and thereafter to exert pressure on said resilient sealing member to break the seal between it and said end of said cylindrical member, whereby fluid is permitted to flow into said cylindrical member, an initial part of the force for breaking the seal between said resilient sealing member and said end of said cylindrical member being exerted through the sealing surfaces of the end of said hollow stem and the end of said projection and the remainder of the force for breaking the seal between said resilient sealing member and said end of said cylindrical member being exerted through abutting surfaces of the end of said hollow stem and a stiffening sleeve surrounding said projection.

5. A dispensing device for dispensing a predetermined quantity of a fluid under pressure comprising a cylindrical member, a resilient sealing member, means for holding said resilient sealing member in sealing contact with an end of said cylindrical member, said resilient sealing member and said end of said cylindrical member constituting an inlet valve for controlling the admission of fluid to said cylindrical member, an actuating member slidable in fluid tight manner in said cylindrical member and having a hollow stem through which discharge of fluid from said cylindrical member can occur, and an annular sealing skirt integral with said hollow stem and making contact with the inner wall of said cylindrical member, the end of said hollow stem being adapted to be brought into sealing engagement with said resilient sealing member whereby discharge of fluid from said cylindrical member through said hollow stem is prevented, and thereafter to break the seal between it and said end of said cylindrical member, whereby fluid is permitted to flow into said cylindrical member.

References Cited in the file of this patent

UNITED STATES PATENTS

| | | |
|---|---|---|
| 2,506,449 | Greenwood | May 2, 1950 |
| 2,701,163 | Teller et al. | Feb. 1, 1955 |
| 2,757,826 | Thomas | Aug. 7, 1956 |
| 2,781,954 | Bretz | Feb. 19, 1957 |
| 2,858,053 | Waldherr | Oct. 28, 1958 |
| 2,892,576 | Ward | June 30, 1959 |